US006856676B1

(12) United States Patent
Pirot et al.

(10) Patent No.: US 6,856,676 B1
(45) Date of Patent: Feb. 15, 2005

(54) SYSTEM AND METHOD OF CONTROLLING AND MANAGING VOICE AND DATA SERVICES IN A TELECOMMUNICATIONS NETWORK

(75) Inventors: Johan Pirot, Tremelo (BE); Marc Jadoul, Beveren (BE); Rombaut J. Roscam, Boortmeerbeek (BE); Peter J. O'Connell, Heath, TX (US); Thomas C. McDermott, Plano, TX (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/418,113

(22) Filed: Oct. 14, 1999

(Under 37 CFR 1.47)

Related U.S. Application Data

(60) Provisional application No. 60/104,408, filed on Oct. 15, 1998.

(51) Int. Cl.[7] .............................................. H04L 29/00
(52) U.S. Cl. ........................ 379/201.01; 379/201.03; 379/201.12
(58) Field of Search ................................ 379/219, 230, 379/201.01, 201.03, 201.12, 126, 127.02, 93.02, 210.02, 189

(56) References Cited

U.S. PATENT DOCUMENTS

| 6,064,653 | A | * | 5/2000 | Farris | 370/352 |
| 6,130,935 | A | * | 10/2000 | Shaffer et al. | 379/127 |
| 6,178,438 | B1 | * | 1/2001 | Tschirhart et al. | 709/200 |
| 6,418,461 | B1 | * | 7/2002 | Barnhouse et al. | 709/201 |
| 6,452,915 | B1 | * | 9/2002 | Jorgensen | 370/338 |
| 6,456,594 | B1 | * | 9/2002 | Kaplan et al. | 370/238 |
| 6,483,912 | B1 | * | 11/2002 | Kalmanek, Jr. et al. | 379/219 |
| 2003/0095542 | A1 | * | 5/2003 | Chang et al. | 379/900 |

FOREIGN PATENT DOCUMENTS

WO    WO98/06215    2/1998

OTHER PUBLICATIONS

Campbell, et al. ,"Overview Building Open Programmable Multimedia Networks", Computer Communications 21, 1998 Published by Elsevier Science B.V., pp. 768–770.

* cited by examiner

Primary Examiner—William J. Deane, Jr.
(74) Attorney, Agent, or Firm—Baker Botts; Craig A. Hoersten; V. Lawrence Sewell

(57) ABSTRACT

A system of controlling and managing voice and data services in a telecommunications network includes a media gateway interface coupled to a plurality of diverse voice and data media gateways operating under diverse protocols in the telecommunications network, the media gateway interface being operable to communicate service logic with the media gateways.

A media gateway controller is in communications with the media gateway interface and media gateways and carries out service logic for a voice or data service according to input received from the media gateways. The system also includes a service management subsystem in communications with the media gateway controller and being operable to provision services with customers and provide service management tools for managing the services, and a service creation subsystem in communications with the service management subsystem and being operable to provide service creation tools for creating the service logic of the services. A customer care subsystem in communications with the service management subsystem is provided for generating billing records and customer invoices for the voice and data services.

28 Claims, 5 Drawing Sheets

SYSTEM AND METHOD OF CONTROLLING AND MANAGING VOICE AND DATA SERVICES IN A TELECOMMUNICATIONS NETWORK

CROSS REFERENCE TO RELATED APPLICATIONS

This application claims the benefit of U.S. Provisional Application No. 60/104,408 filed on Oct. 15, 1998.

TECHNICAL FIELD OF THE INVENTION

This invention is related in general to the field of telecommunications equipment. More particularly, the invention is related to a system and method of controlling and managing Internet protocol (IP) services in a voice/data telecommunications network.

BACKGROUND OF THE INVENTION

The landscape of today's telecommunications network is vastly different from that of just a few years ago. The volume of data transfer is fast superseding the volume of voice traffic. The switched voice-dominated networks will most likely be replaced by data-dominated networks. However, the change will not take place overnight. The transition from voice-switched to data-switched networking is an evolutionary process rather than a revolution. The transition involves migrating from one networking philosophy to a second.

Voice switching involves intelligence that resides in the telecommunications network itself, since the end-user equipment, i.e. the telephone, is a fairly simple device. In order to make networks more manageable, the needed intelligence has been moved into the Intelligent Network (IN) nodes.

In data networking, the network primarily provides transport of data while the intelligence resides in applications running on hosts connected to the data network. Of importance is the ability to provide faster transport while minimizing delay. As part of the transition, customers and user groups are now able to be connected with virtual connections by implementing virtual private networks (VPN). Further, the provisioning of different quality of service (QoS) levels is also important. In order to implement various QoS levels in an effective and manageable way, service management systems have been introduced.

SUMMARY OF THE INVENTION

In order to control this heterogeneous world from network and services control point-of-view, a system and method of controlling and managing voice and data services is needed.

In an aspect of the present invention, a system of controlling and managing voice and data services in a telecommunications network includes a media gateway interface coupled to a plurality of diverse voice and data media gateways operating under diverse protocols in the telecommunications network, the media gateway interface being operable to communicate service logic with the media gateways.

A media gateway controller is in communications with the media gateway interface and media gateways and carries out service logic for a voice or data service according to input received from the media gateways. The system also includes a service management subsystem in communications with the media gateway controller and being operable to provision services with customers and provide service management tools for managing the services, and a service creation subsystem in communications with the service management subsystem and being operable to provide service creation tools for creating the service logic of the services. A customer care subsystem in communications with the service management subsystem is provided for generating billing records and customer invoices for the voice and data services.

In another aspect of the present invention, a system of controlling and managing voice and data services in a telecommunications network includes a media gateway interface coupled to a plurality of diverse voice and data media gateways operating under diverse protocols in the telecommunications network, the media gateway interface being operable to communicate service logic with the media gateways.

A media gateway controller is in communications with the media gateway interface and media gateways and carries out service logic for a voice or data service according to input received from the media gateways. The system also includes a service management subsystem in communications with the media gateway controller and being operable to provision services with customers and provide service management tools for managing the services, and a service creation subsystem in communications with the service management subsystem and being operable to provide service creation tools for creating the service logic of the services. A customer care subsystem in communications with the service management subsystem is provided for generating billing records and customer invoices for the voice and data services. A service assurance subsystem is in communications with the service management subsystem and is operable to collect data and voice service events and monitor the performance of data and voice services in the network. A network management subsystem in communications with the media gateway controller is operable to monitor and manage the behavior of the media gateways. A directory is in communications with the service management subsystem and the media gateway controller and is operable to provide customer name, location and domain translations.

BRIEF DESCRIPTION OF THE DRAWINGS

For a better understanding of the present invention, reference may be made to the accompanying drawings, in which.

DETAILED DESCRIPTION OF THE INVENTION

Figure 1:
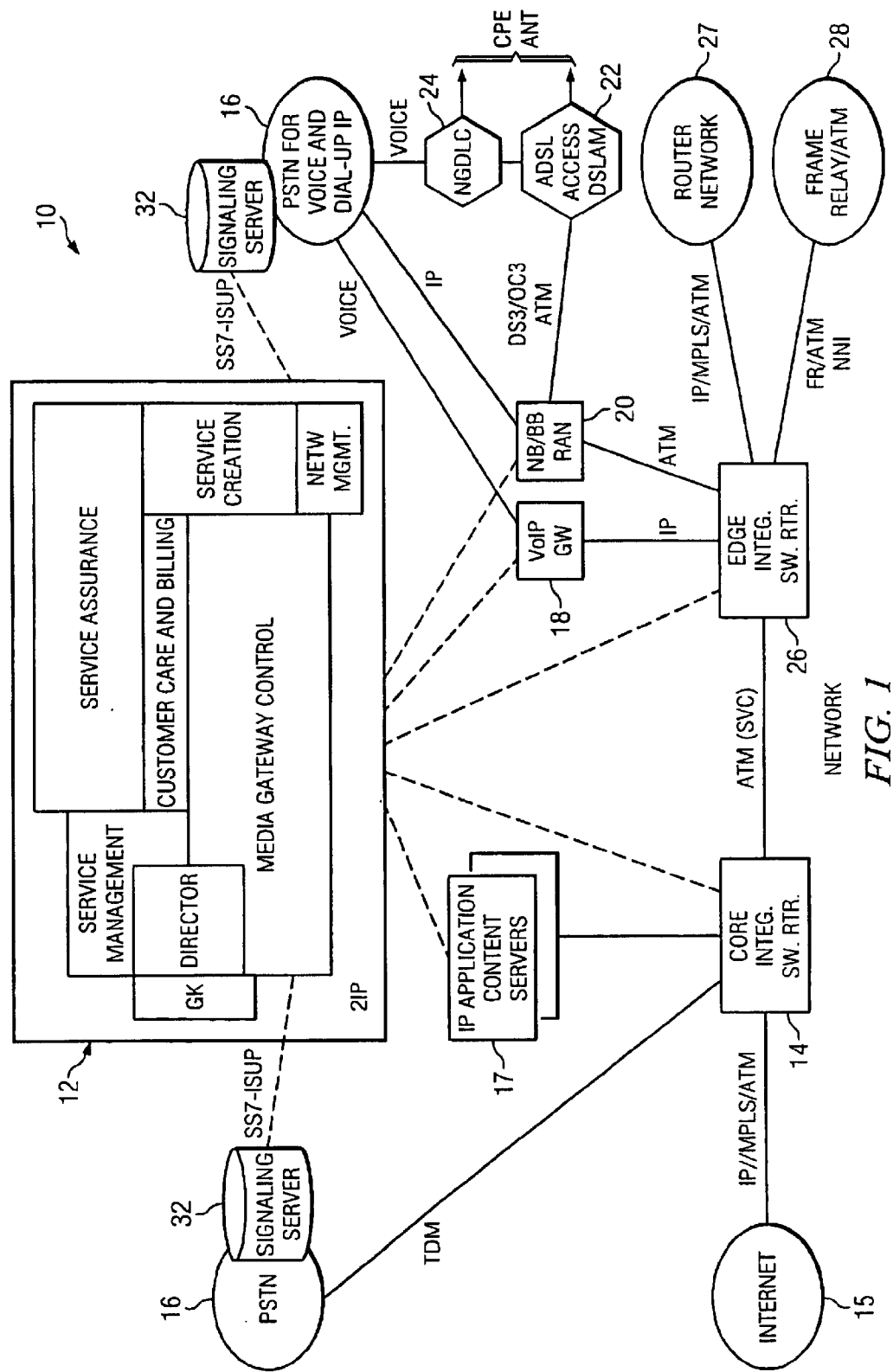
FIG. 1 is a block diagram of a telecommunications network including an embodiment of the system and method of controlling and managing Internet protocol services in a voice/data telecommunications network according to the teachings of the present invention.

FIG. 1 is a block diagram of a telecommunications network including an embodiment of the system and method 11 of controlling and managing Internet protocol services in a voice/data telecommunications network according to the teachings of the present invention. FIG. 1 provides a general overview of various network elements in telecommunications network 10, such as an Intelligent Network (IN). Network 10 includes system and method of controlling and managing Internet protocol services 11, which serves as an ultimate platform for controlling access to services and providing enhanced services. System and method 11 may be envisioned as a greatly enhanced version of an intelligent platform (IP) network node in the Intelligent Network. System and method 11 is shown in FIG. 1 with various exemplary media gateways (MGs) that may be coupled therewith communicating voice and data traffic in various formats.

For voice services, traffic can be exchanged between narrowband switches directly via broadband ATM (asynchronous transfer mode) switches (14 or 26) interconnecting the legacy PSTN (public switched telephone networks) 16, or via IP (Internet protocol) packet networks using voice gateways 18.

For dial-up data services, access is given to the data network via RANs (Remote Access Nodes) 20. This is valid for narrowband services where dial-up users (modem or ISDN) are terminated on Narrowband (NB) RANs 20 as well as for broadband users connected via ADSL access devices 22. RAN 20 generally interfaces between the access network and the (IP) data network. The access network can be the fixed or mobile PSTN network, or it can be a fixed access network such as ADSL. ADSL users connected to an ANT (ADSL Network Termination)(not shown) may be terminated in the CO (Central Office) on a DSLAM (DSL Access Multiplexer) 22. The DSLAM and DSL provide for the NGDLC (next generation digital loop carrier) 24 concentration of traffic at the ATM layer.

These connections may go directly into the ATM backbone and to the final destination, or it can be processed further by a BB RAN—Data Application Network Adapter (DANA) 22. The latter can apply value-added services in the same way as for NB dial-up users.

Fixed data users are connected directly to a switch (Frame Relay or ATM) or to a router (IP). These network elements evolve to integrated switch-router products such as core and edge switches 14 and 26 shown in FIG. 1. Fixed data services are connected directly at the transport through an edge integrated switch router (ISR) 26, such as the A1100 HSS manufactured by Alcatel. for example. Edge integrated switch router 26 may frame-relay or ATM traffic from local exchange carrier (LEC) via router network 27 or FR/ATM access network 28 through standard interfaces such as P-NNI for interoperability and seamless services. In addition, by incorporating a powerful routing and switching function, edge integrated switch router 26 performs traffic flow characterization of IP packets carried over ATM and FR interfaces. As such, edge integrated switch router 26 performs media adaptation and gateway functions for fixed line services.

Another important function performed by edge integrated switch router 26 is to combine the IP data services with the fixed FR and ATM services over an ATM transport layer. The MPLS (multi-protocol label switching) standard protocol may be used to interwork with edge routers and forward the IP traffic through the backbone, taking full benefits of the ATM layer capability. IP switching at the ATM layer 2, i.e. shortcut path connections, eliminates the need for intermediate transit routers that form bottlenecks in a large network.

IP traffic moves through the switches without packet-by-packet routing. As a result, edge integrated switch router 26 provides reliable and predictable response time to IP traffic, enabling premium pricing of value-added services, such as VPN services and true IP QoS for stringent SLA (service level agreement). In addition, the tight coupling between IP services and ATM transport layer allows for trunk bandwidth optimization and reduces the complexity of layer 2 configuration and PVC (permanent virtual circuit) management.

The core switch layer function is supported by core integrated switch router 14, such as the Alcatel A1000 BBX, for example, a terabit scalable ATM switch with broadband SONET/SDH transmission interfaces. Core integrated switch router 14 provides a robust core ATM transport infrastructure for both IP data and voice traffic. Switch router 14 performs layer 2 IP forwarding using routing protocols such as MPLS and offers native IP interface to the global Internet 15, carrier IP service providers 16, and IP application content servers 17. Switch router 14 may also interworks with the existing long distance voice switches through a NB/BB gateway 20. The NB/BB gateway 20 provides TDM (time division multiplex) trunks and performs the SS7 signaling protocol and the ATM adaptation.

Together, Core integrated switch router 14 and edge integrated switch router 26 allow a service provider to establish a carrier-grade network infrastructure for voice and the growing demands of data, video and multimedia services in the future.

System and method 11 is also coupled to IP application content servers 17. IP application content servers 30 are platforms which provide content of one or more types, such as voice, data, video, web pages, etc. to service subscribers. System and method 11 may also be coupled to signaling servers 32 which interfaces with SS7 network devices and IP (H.323) gatekeepers.

According to the IP Device Control (IPDC) standardization work, all these network elements are grouped under the common name media gateways (MGs) because they provide services between incoming and outgoing interfaces. The behavior of the media gateway is fully defined by the media gateway controller (MGC) which contains all service logic. The physical management of the media gateways is done by the network management system.

Figure 2:
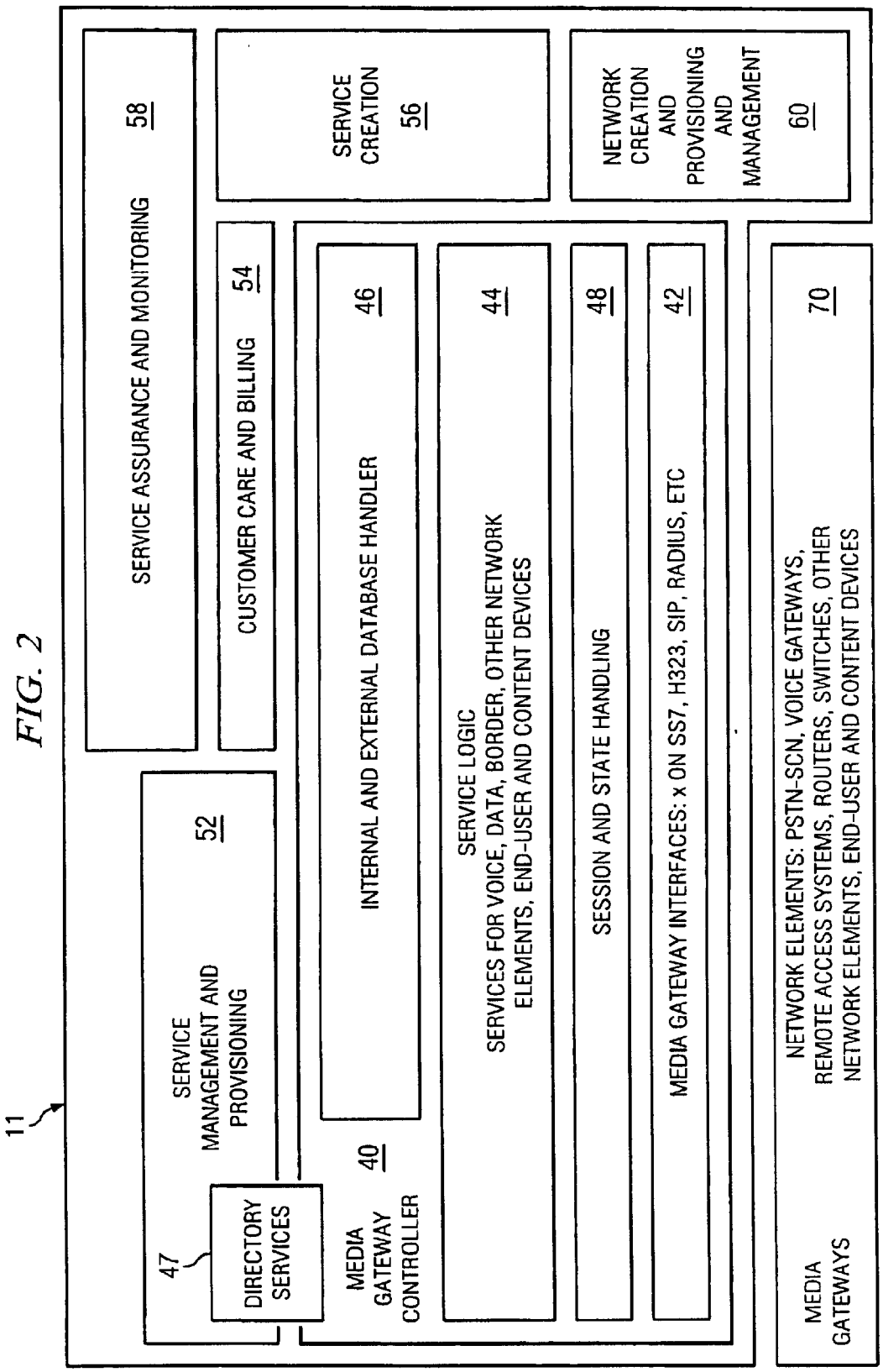
FIG. 2 is a simplified block diagram of an embodiment of the system and method of controlling and managing Internet protocol services in a voice/data telecommunications network according to the teachings of the present invention.

FIG. 2 is a top level functional block diagram of system and method of controlling and managing Internet Protocol services in a voice/data telecommunications network. System and method 11 of the present invention includes a media gateway controller (MGC) 40. Media gateway controller 40 performs the "real-time" functions with media gateway interface 42 which interact with media gateways 70 and executes service logic 44 that defines the behavior of the media gateway. Media gateways 70 may include IP or non-IP network elements such as PSTN-SCN (public switched telephone network-switched circuit network), voice gateways, remote access nodes or systems, routers, switches, and end-user and content devices.

Service logic 44 uses internal and external databases handlers 46 to access data from internal and external databases (not shown), and may also interact with directory services 47 to resolve name, domain and location association or perform lookup. Media gateway controller 40 also includes a session and state handler 48 which keeps a session and state of the ongoing actions in the network.

System and method 11 further includes a service management and provisioning subsystem 52 which provides the facilities to enter new users and services with associated policies. Service management and provisioning subsystem 52 provides interfaces for the network operator (e.g. also interface for legacy systems) and customers. The latter can be service providers or end-users.

System and method 11 also includes a customer care and billing subsystem 54 which provides for the management of subscribers and the generation of customer invoices.

A service creation subsystem 56 of system and method 11 allows the creation of new service in terms of logic, database structures and management/provisioning means.

System and method 11 further includes a service assurance and monitoring subsystem 58 which contains all aspects of service and network event handling up to full service layer agreement (SLA) management.

A network creation, provisioning and management subsystem 60 handles all aspects related to the physical behavior of the media gateways for system and method 11.

Figure 3:
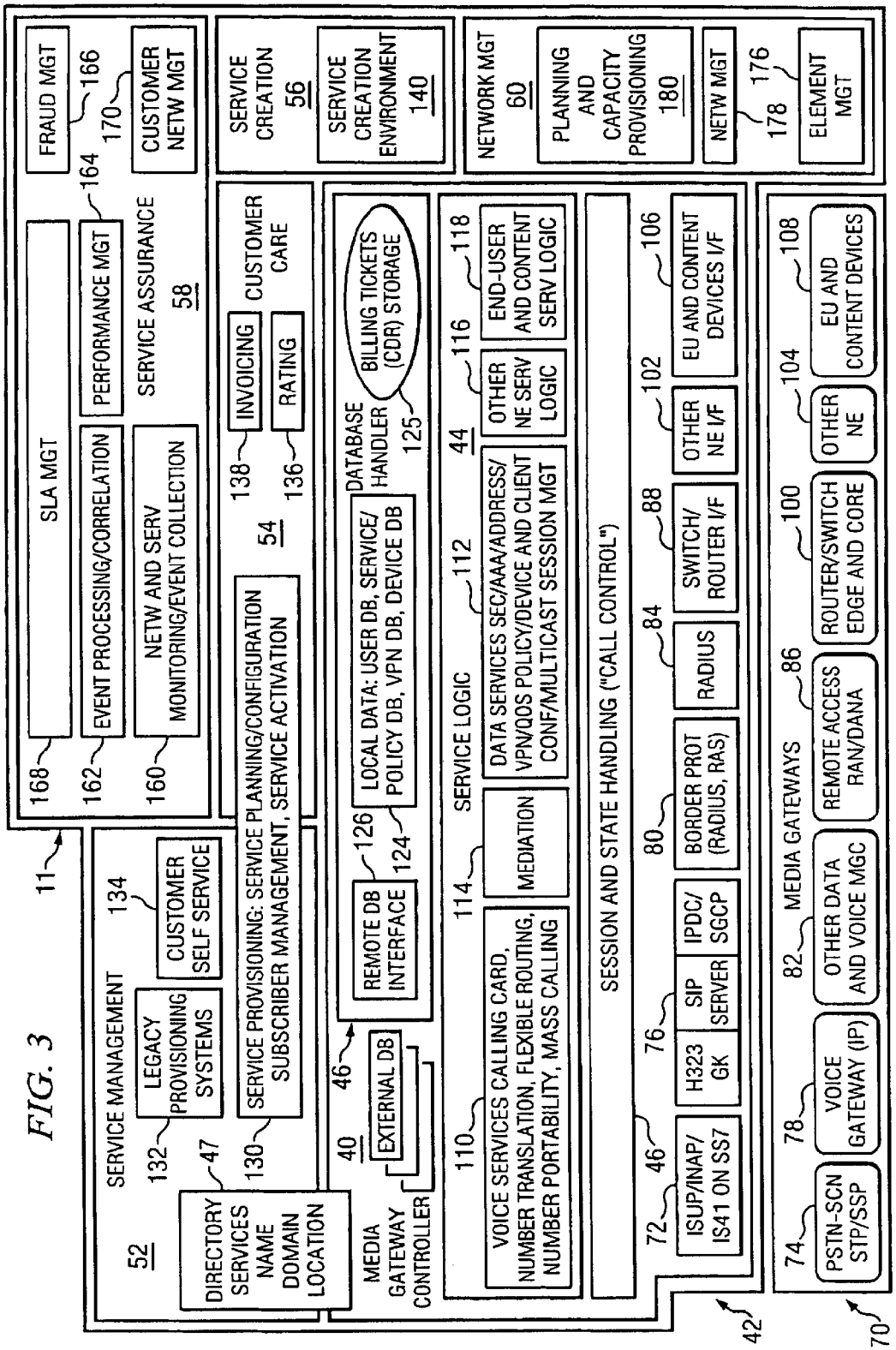
FIG. 3 is a more detailed block diagram of an embodiment of the system and method of controlling Internet protocol services in a voice/data telecommunications network according to the teachings of the present invention.

FIG. 3 is a more detailed block diagram of system and method of controlling and managing Internet protocol services in a voice/data telecommunications network 11. It may be seen that the lowest layer of media gateway controller 40 contains the interfaces to various media gateways 70. Media gateway interface 42 may include a first interface 72 which provides SS7 signaling to PSTN or switched circuit networks (SCN) 74 with ISUP (integrated services digital network user part) for interfacing to STP/SSP (signaling transfer point/service switching point) and INAP (intelligent network application protocol) and IS41 for interfacing to IN devices and HLR (home location register) systems. A second interface 76 provides interface functions to voice gateways 78 in a number of protocols, such as RAS (registration admission status) protocol interface for connecting to H.323 VoIP gateways and H.323 end-points. Other protocols interfacing to VOIP gateways may include SIP (session initiation protocol) and IP device control/simple gateway control protocol (IPDC/SGCP). SIP is targeted at IP services such as click-to-dial or real-time fax. IPDC and SGCP will be combined into a common protocol referred to as media gateway controller protocol (MGCP).

Media gateway interface RADIUS 84 provides interface to RADIUS (remote authentication dial-in user service), which is the standard protocol to interface to remote access devices such as RAN and DANA 86. This protocol is generally used for narrowband (modem, ISDN) and broadband (ADSL, etc.) devices.

Another media gateway interface is a switch/router interface 88 for interfacing with edge and core router switches 100. Currently, edge and core routers and switches 100 are configured from the network management system, mainly by using SNMP. Once these devices become QoS and policy enabled, service protocols will be added. The service protocol may be RADIUS, but it is likely that other protocols based on LDAP (lightweight directory access protocol) will be used for this purpose.

Other open or dedicated interfaces 102 may also be added for other network elements 104. For example, if the network operator wants to control firewalls at customer locations or his own firewalls.

End-user devices and applications servers ("content devices") 108 may further be managed by providing an interface 106 in media gateway controller 40. The protocol may be LDAP-based or be based on some other protocol with some dedicated directory structures on top.

Above media gateway interface layer 42, media gateway controller 40 operates a session and state handling function 46. This function keeps track of the different states in the media gateways. A session context is maintained for those situations where appropriate such as dial-up sessions, VoIP sessions, etc.

The core of media gateway controller 40 is service logic 44. Service logic 44 defines the functioning of the whole network including how all network elements behave, and which functions they execute for which user at what time. Based on the data stored in the database, the service logic runs appropriate service functions and provide the media gateways the necessary data to function. Service logic 44 contains voice services 110 and data services 111. Depending on the contextual information delivered with the call, a service is invoked. The contextual information includes origination information such as calling and called number, DTMF (dual tone multiplexed frequency) key tones entered by the user, origination location information such as payphones or hotels, institutional identifier, a network identifier, ISP (internet service provider) information. Call set-up may be accomplished via in-band signaling, out-of-band signaling including ISDN or SS7, from H.323 terminals and gateways, or from a SIP server. External parameters (e.g. date, time of day, etc.) may initiate some element or sub-element functions of the service logic. These services are executed as control is maintained from media gateway controller 40 to the affected media gateways. Typical services that are provided by exchanges, service nodes and IN systems include class services, such as call number or name block, automatic callback, auto recall, selective call forwarding, selective call rejection, selective call acceptance, distinctive ringing, customer originated trace, call waiting, three-way calling, call transfer, speed dial, ring again, etc. Other examples of typical services include voice mail, home intercom, automatic line/warm line, facsimile, calling card services (prepaid, credit, collect call, etc.), Centrex, enterprise network services (virtual private network, screening services, etc.), conference calling, number translation and routing (1-800, 1-900, universal access number, etc.), local number portability (LNP), and mass calling and televoting services. Terminating services may be invoked by the terminating media gateway controller if the originating network differs from the originating network. Examples include one number/follow-me services, call forwarding, call re-direction, call hold and transfer, voice mail or distinctive alerting tones.

Invoking a data service 111 is similar to invoking a voice-oriented service. The origination of the call to identify the user, the originating network and to identify any queries for value-added service providers may be used to invoke service logic for data services. Basic services that are supported include security and AAA (authentication, authorization, accounting). This function is primarily oriented toward dial-up users and important for calls that cross network boundaries. It provides the necessary facilities to identify users and execute different types of access and services. The level of access permitted coincides directly with the requested service in accordance with policies that correspond to those services, a particular subscriber or an associated network. Different service levels may be administered. Corresponding accounting functions will be performed.

Another basic data service includes address assignment. In a dial-up IP environment, dynamic IP addresses have to be assigned. Consequently, it may be required to manage a pool of IP addresses. In a fixed access environment, address assignment can be useful to temporarily assign different IP addresses to certain users. The QoS policy service is implemented by assigning a quality-of-service policy to services or a subscriber based upon a service level agreement. The levels of QoS are stratified using parameters such as best effort, medium grade and best grade. For ATM transport, QoS is based upon the service level (CBR, VBR, ABR, UBR, etc.) and up to 16 classes of service for each service. Another data service is virtual private network. All of the above functions are performed in a "VPN way". Access restrictions, billing, IP pools, QoS policies, etc. may be performed using virtual routing tables within the media gateway controller for each member of the VPN. IP tunneling techniques combined with security mechanisms such as IPSEC may be applied for each user group belonging to the same VPN.

Device and client configuration data services that download profiles and policies from the network into the terminals can also be performed. Multicast session management services start-up and manage multicast sessions by adding and subtracting participants.

The above listings are not exhaustive and will grow continuously as new services are defined and new media gateways are added to the system.

Service logic 44 also may include mediation services 114. Media gateway controller 40 provides the control necessary for the media gateways to interface to other domains or networks that belong to other network operators. Media gateway controller 40 may also interface directly with other vendor media gateway controllers of other operators, assuming that all vendors maintain an open interface and protocol. Compliance and interoperability testing are paramount in attaining cross-network functionality. Service logic 44 defines what information is sent to which media gateway controller of other operators, process the responses, and performs the actions necessary for the other service logic components. Other network element service logic 116 is added as new network elements are added. End-user and content service logic 118 includes service logic for end-user and content devices such as cookies, applets, etc., may be added.

It may be seen that service logic 44 is the core of network and service control. It defines which services are executed and by what parameters. It implements the network operator's business strategy and largely defines the revenue resulting from the offered services.

Media gateway controller 40 may use local and remote database interfaces 114 and 116 to access internally or externally located databases, respectively. The databases may be concatenated into an array where the data necessary to execute a service is accumulated from one or more databases. Database handler 46 administers the query to interrogate the appropriate database requested by service logic 44. The appropriate data is then fetched from the correct database and is returned to the service logic program.

Closely linked to the database handler and service logic is directory services 47. This function, which can be co-located or be distributed on one or more external systems, generally provides resolution of name, domain and locations.

Service management subsystem 52 is the entry point of the network operator and possibly for customers connected to media gateway controller 40. Service management subsystem 52 may contain a service provisioning function 130. Service provisioning function 130 generally performs subscriber management to create and modify service subscribers and associated profiles, service configuration to modify service profiles with corresponding policies, service activation to launch a service on the network and allow customers to make use of this service, service planning to plan resources resulting from intended service deployment.

Service management 52 also may include legacy provisioning systems 132 which allow operators to use their current provisioning systems without upgrade. Service management 52 also provides customer self service tools and interfaces 134 for network operators, content service providers who have their own subscribers, and for end-users themselves to enter service data (e.g. self-registration). Service management 52 may also contain all productivity tools to perform effective media gateway controller functions.

Service management subsystem 52, such as the Alcatel USA 1135 SMC (Service Management Center) for example, allows the operator to function in three modes of operation. First, the network operator can function as an Internet service provider. The service management subsystem 52 may function as a full AAA server, where AAA is defined as authentication, authorization and accounting. Authentication is the process of identifying the user by his password, calling number, etc. Authorization is the process that allows the user to enter certain classes of services, or certain quality levels of services. Accounting is the performance of billing and accounting of end-users, customers (ISPs and enterprises) and other network operators (e.g. in roaming environment). Second, the network operator can implement VPNs for dedicated customers (ISPs or enterprises), i.e. virtual networks running a dedicated "service" with a certain service quality layer, on a single physical network. The network operator can allow the VPN operators to access his service management subsystem so that they can perform the AAA functions on the operator's service management subsystem 52. Therefore, these VPN operators can access the service management subsystem 52 remotely and get a "VPN view" on the service management subsystem 52. In other words, the VPN operators can manage their own users and services. The network operator can impose some further restrictions on the VPNs whenever deemed necessary. Third, the network operator can also function as an Internet access provider whereby he terminates the access side, and then send concentrated traffic to the customers. Also the management data may be passed towards the customers. Therefore, the service management subsystem 52 can function as a "proxy server" whereby the service management subsystem 52 forwards the service management requests from the network elements towards the AAA servers of the different customers. Functions to screen the requests in both directions and to implement some further service quality oriented functions for the customers (e.g. management of access ports and speed) are provided.

Next to these modes of operation in which the service management subsystem 52 plays different roles, the service management subsystem 52 also plays an essential role in new global network constellations implementing roaming agreements with other network operators.

It may be seen that the service management subsystem 52 will be a crucial element in environments where the network operator needs to implement service layer agreements. This is valid to end-user customers such as ISPs and large corporations as well as other network operators. Implemented in this manner, it is the service management subsystem 52 that allows the operator to realize the tremendous economies of scale of his large network by implementing many VPNs on his physical network. In other words, the network operator can re-sell the physical network many many times. Consequently, the service management subsystem 52 is a key tool to allow the operator to generate more revenue on the network.

Customer care and billing subsystem 54 of system and method 11 provides registration services described above and also additional subscriber management functions such as tools for investigation of user problems, marketing tools, etc. Customer care and billing 54 further provides rating and invoicing functions 136 and 138 for data as well as voice services. In addition to generating the traditional billing records for voice and dial-up access services, this component also contains new types of billing specific to a data environment, such as data-flow information including the number of bytes, time-of-day, peak data rates, etc. All billing is generally based on the service definitions with their corresponding policies that specify a service level agreement. These systems are intended to interwork with existing legacy regional office accounting (RAO) automated accounting (AMA) systems provided the interfaces can be characterized into a protocol for exchanging data. Therefore, intermediate real-time data (before and after rating) is available and can be exported to those AMA systems for further processing. Because of the fast evolution of new services needing new billing and rating procedures, and the expected introduction of general new billing procedures for pre-existing IP services, flexibility is an important aspect to system and method 11.

Figure 4:
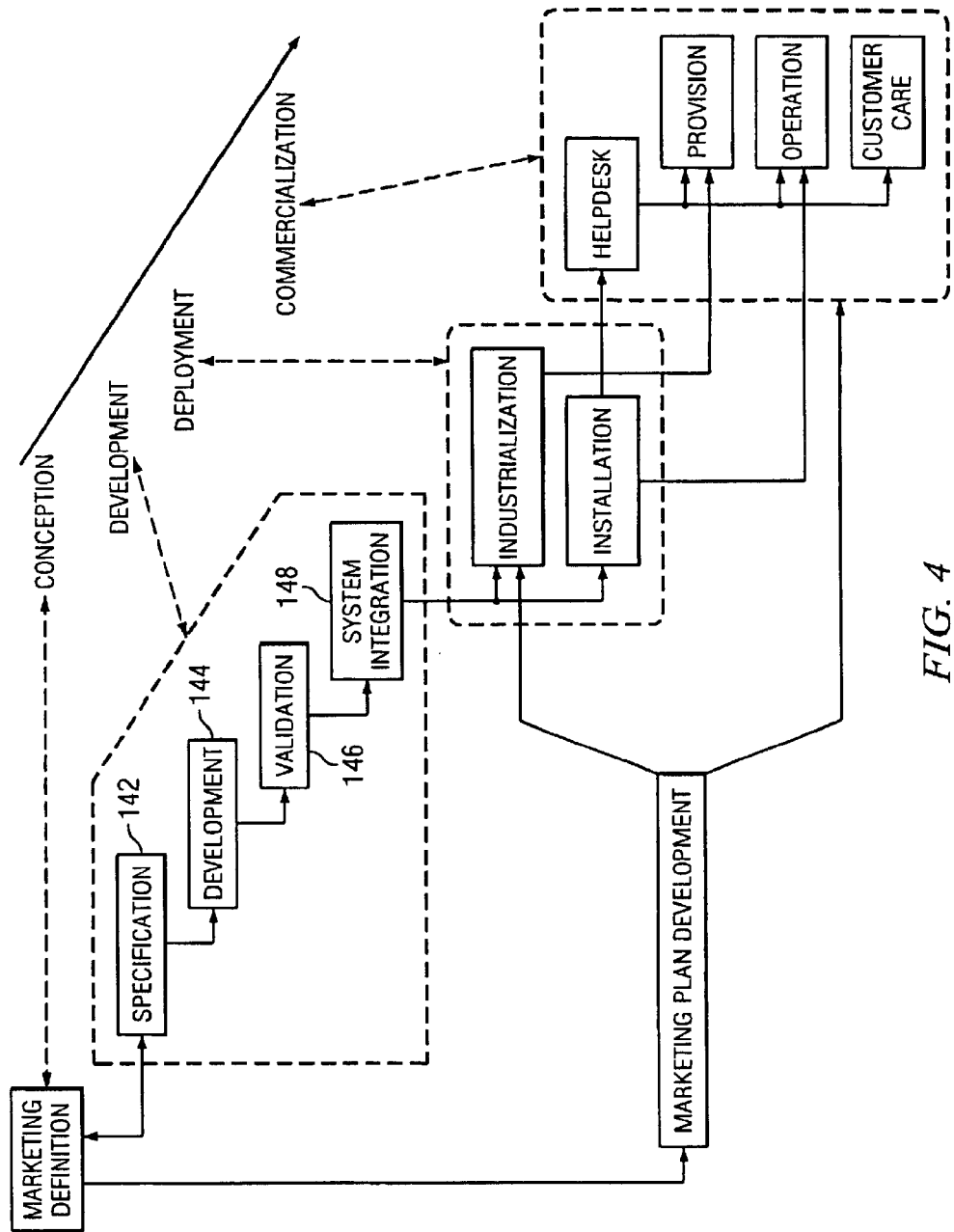
FIG. 4 is a flow diagram of an embodiment of a service creation life cycle according to the teachings of the present invention.

System and method of controlling and managing IP services 11 further includes service management and creation subsystem 56. Service creation has, over the last few years, gained great interest from the operators and subscribers to achieve a common goal—fast time-to-market to be competitive, and as such needs to be supported by efficient tools, support and procedures. Service creation 56 includes a service creation environment 140 which provides an interface or a tool set that is not limited to programming the service, but covers the complete development phase of the service life cycle, as shown in FIG. 4. It may be seen that the service life cycle includes the conception phase, development phase, deployment phase, and commercialization phase. The development phase includes specification of the service 142 and scripting or development of service logic 144, which includes the creation of appropriate database structures and management interfaces for operators, service providers and users, service supervision and statistics, rating and billing procedures, etc. Service creation environment 140 further provides off line simulation and validation 146 of the services and integration with the hosting network 148. A mature service creation tool supports all activities related to the above phases of the life cycle and is able to operate at a high level, making as much as possible abstraction from the underlying infrastructure, i.e. the control gateways.

Another subsystem of system and method 11 is service assurance 58. Service assurance 58 is key in implementing and executing agreements with customers. It contains all aspects of service and network event handling up to full service level agreement (SLA) management. The primary functions of service assurance 58 include network and service monitoring and event collection 160. Because of the many components within the network, a central place to collect events is needed to monitor the behavior of the whole network and the services being executed on it. Event processing and correlation 162 is characterized as the correlating and interpreting network events and alarms, in order filter, and prioritize and react to them in the most appropriate way—either by the network, the network management system or the craft personnel. This significantly reduces the complexity of managing the network and the services. Moreover, the amount of information to be processed by the craft is dramatically reduced.

Performance management 164 provides tools to follow up on the behavior of the network and the influence of certain services on the network. Starting from statistical data and call detail records containing contextual call data, statistical reporting tools provide the basic input for measuring performance. The performance management tools further process the data.

Fraud management 166 includes several security mechanisms to protect against fraudulent usage of the network, the services on the network, and on system and method 11 itself. Fraud management 166 also records and maintains various logs to verify fraud. User accounts can also be disabled, temporarily or permanently, in case intrusion is detected.

SLA management 168 occupies the top layer of service assurance 58. Based on input from all lower levels, the agreements with the customers and end-users are performed. SLA management layer 168 also includes service quality management, i.e. the verification that services are running at a certain performance on the network.

Customer network management 170 provides interfaces to virtual private network (VPN) customers to perform dedicated network management functions. Customer network management 170 provides views and reporting of data to the customer as well as providing the VPN customer the ability to configure certain service parameters.

The last major functional block of system and method 11 is network management 60. Network management subsystem 60 manages all aspects related to the physical behavior of the media gateways. The main elements of subsystem 60 may include an element management element 176, which performs all configuration, software download and interaction functions with the different network elements. A second element is a network management element 178, which handles alarms and network layer configuration. Planning, capacity and provisioning element 180 provides tools for defining further deployment of media gateways. These tools interact with other components of service management and assurance 58.

Today, many new Internet access networks are being constructed in order to provide residential and corporate end-users remote access to applications such as e-mail, Internet services, newsgroup and WWW services, access to corporate networks and access to dedicated intranet and extranet networks. Increasingly, network service providers are becoming Internet access providers (IAP), where they provide wholesale remote access and virtual access network services to Internet service providers (ISP) and enterprises. This allows the ISPs to outsource their remote access and to concentrate on providing connectivity to the Internet backbone and value-added services such as web-page hosting.

When building these new access networks, the challenge for the network operator is to design them so that different kind of access technologies, including, for example, xDSL, which address the heterogeneous user population, are embraced. Further, new access and network technologies can easily be included into the complete network environment (e.g. evolution from narrowband to broadband). All the different user groups get access to services and a layer of service quality in accordance with the amount they want to pay for it. Additionally, the network is built in such a way that the network operator can realize important economies of scale. System and method 11 of the present invention addresses each of these challenges. The applied network elements provide carrier-class building blocks and allow migration to new access technologies. System and method 11 components implement state-of-the art IP functionality to allow extensive VPN capabilities. Evolution to IP QoS is also contemplated.

Another key element of system and method 11 is to have a powerful service management platform. In order to accommodate the increasing demand for speed and to provide all required services on the access technologies, the operator needs a service management platform that interfaces to and "integrates" all these access systems and provides similar services to the end-users on all these platforms.

The selection of a service management platform is an important choice for the operator since it defines which businesses the network operator will be able to perform, the efficiency in setting up different businesses, as well as the range of network products the network operator can use now and in the future. Therefore, this is a strategic choice with mid- to long-term consequences.

A service management subsystem 52 provides easy entry of user and services data employing different interfaces, such as operator entry (service provisioning), import of files (legacy provisioning), and user self-registration (customer self service). Further, the service management subsystem 52 provides a link between users and services with very extensive authorization levels, i.e. access to different categories of services (e.g. using IP filtering) or different service quality levels (e.g. by managing access to virtual circuits and tunnels). The service management subsystem 52 also provides extended accounting, taking into account time and volume based billing (billing tickets, rating and invoicing). Billing processing is performed in three steps. First, the billing tickets are generated and stored. Then rating is performed by converting raw format into "money tickets" by taking into account all kinds of telco-oriented parameters such as time, holiday and even access speed. Third, the invoice for each user is the computed. The service management subsystem 52 further provides interfaces to other systems to incorporate transaction-based billing from e-mail, WWW servers, etc. The data can be extracted by the operator on every level out of a standard database using service management functions. The service management subsystem 52 allows reporting of data by generating pre-formatted statistics reports and user-specified reports.

The VPN operator may run a remote service management subsystem user interface hosted on a small portable computer such as a laptop PC that allows entry into network operator AAA database. He is allowed access to the same features as defined above and can manage the same data, limited to the VPN view to which he has access. The network operator can control the overall operations of the VPN, and impose some additional limitations. He may also manage and control the service level agreed with the VPN operator on the service management subsystem 52, e.g. by applying VPN access port management. The service management subsystem 52 may also include some unique proxy features. The service management subsystem 52 performs forwarding of authentication and accounting requests toward customers based on called number, calling number, username, domain name, RAN identification or any combination of these. Every destination is considered as a VPN. A destination can be composed of many physical AAA servers in order to implement reliable services for every individual VPN. The service management subsystem 52 also performs port allocation management by monitoring the number of access ports per VPN used on the network. A certain minimum can be guaranteed per VPN, and a maximum per VPN may also be imposed. The minimum and maximum number of access ports are key parameters used to guarantee access to a VPN, and to prevent one or a few VPNs of blocking access to the whole network. Protocol translation from RADIUS to TACACS (terminal access controller access system) is also possible so that the network operator can provide services to customers who do not yet support RADIUS as the service management interface. The service management subsystem 52 also performs parameter editing which allows the network operator to indicate which data is sent to the customer, and which data of the customer is sent to the network element. This is important in relation to security, confidentiality of some data and control of the functioning of the network elements. Centralized IP address pool management on the service management subsystem 52 optimizes the number of IP addresses per customer. This is also important for the smaller enterprise customers who may have only a very limited range of IP addresses they can use on the operator's network. Further limitations can be imposed on a VPN basis, such as on the number of simultaneous accesses per user, the times VPN users are allowed to access the network, the services accessed by the VPN users and the different service levels that can be used. More functions are expected in the future.

Figure 5:
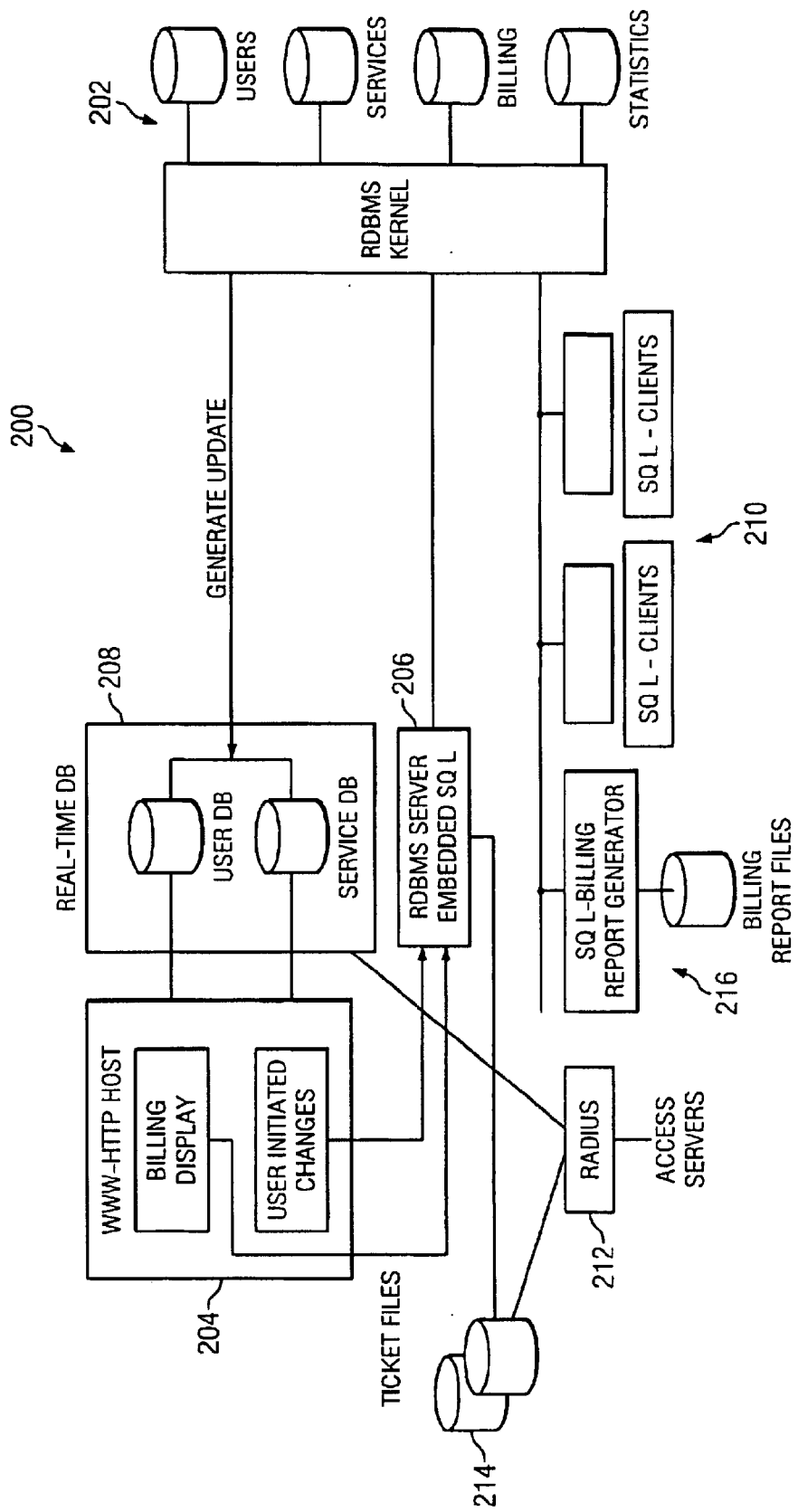
FIG. 5 is a more detailed block diagram of an embodiment of a service management subsystem according to the teachings of the present invention.

The general high layer concept of service management subsystem 52 is shown in FIG. 5. The unique and only source of all data is a set of tables stored in a standard RDBMS 202. In general, six main types of data are stored in these databases 202 subscriber records, service records, network configuration records, billing records, statistics records and general purpose supporting data. The manipulation of those data records is done by client programs 204 running on PCs or workstations under a GUI and operating in client-server mode with the RDBMS server 206. A "real-time" mirror database 208 of a subset of the database (user and service data) is also provided. This database 208 is designed to have a superior access time using direct access hashing algorithms and can be eventually installed in RAM. Real-time database 208 is used to perform functions like logon validation, service selection, registration of billing transactions, etc., all functions which need to be performed with an outstanding performance. The network access servers (NB and BB RAN) communicate with this real-time database using the RADIUS protocol. This system architecture allows running the system on a single computer host, on multiple hosts or on a fully distributed and redundant architecture.

The complete handling (creation, updating, deleting, etc.) of subscriber records is done via an RDBMS client program with GUI 210. The subscriber management system contains a very extensive set of user data that together determine the profile of the user and it's capabilities to access services. These subscriber parameters include administrative parameters such as name, address, telephone, fax, contact address, E-mail address, and vat number; registration parameters such as identification, password, and contract reference; security parameters such as CHAP, PAP, token card keys, tunneling parameters, and micro-payment key; service packaging parameters such as list of service packages user subscribed to, closed user groups membership, QoS subscriptions, e-mail accounts(s), news account(s), and personal WWW home page; billing parameters such as detailed billing, reductions, billing method, and invoice language; account management parameters such as hold indicator, account validity period, and login allowed periods.

The subscriber management system includes national language support. The client programs to manage the accounts can be totally customized by simple point and click parameterization so that for certain users, certain fields can be shown or masked. In addition, the operator can add customer fields to the database to store and manage any additional data. The capacity of the system can be scaled to store up to millions of subscriber records by using the power of an RDBMS for manipulation of the profiles together with a very high performance light-weight real-time database for the real-time transactions. It may be noted that subscribers can themselves manipulate certain parameters of their profile (those that the operator deems to be appropriate) via embedded WWW/HTTP server 204 using CGI programs and HTML forms or Java applets. User self-registration facilities are also provided where users can download (via standard file transfer programs) a self registration program that allows them to set-up an account.

The complete handling (creation, updating, deleting, etc.) of host records is done via an RDBMS client program with GUI. The host management system contains a very extensive set of host data that together determine the profile of the host/application and it's capabilities and the services that it offers (these parameters define the policies that can be used by the end-users). It may be noted that in the concept of the service management system as host could mean a particular WWW site, a collection of WWW sites, a complete network, a gateway service to another network, a certain Intranet domain, a particular corporate application or even the whole Internet.

The host parameters may include administrative parameters such as name, address, telephone, fax, contact address, e-mail address, vat number, etc, of the service provider; network connection parameters such as network address (IP, X.25, FR, ATM, E.164), and network connection parameters; billing parameters such as service costs, volume costs, billing profile, ticket generation, reversed charging facilities, and micro payment membership; contractual parameters such as contract reference; service access parameters such as closed user group (CUG) membership, security parameters; host management parameters such as host record validity, and suspension.

The host management system includes national language support. The client programs to manage the host records can be totally customized by simple parameterization so that for certain operators, certain fields can be shown or masked. In addition, the operator can add customer fields to the database to store and manage any additional data.

The capacity of the system can be scaled to store up to millions of host records by using the power of an RDBMS for manipulation of the profiles, together with a very high performance light-weight real-time database for the real-time transactions.

It should be noted that owners of a host can themselves manipulate certain parameters of their host profile (those that the operator deems to be appropriate) via the embedded WWW/HTTP server using CGI programs and HTML forms or Java applets.

The service management subsystem 52 also incorporates a powerful service packaging system which allows operators to identify and isolate a group of services (sites) on a network and offer this as a package to which subscribers can register. The service packaging application includes a GUI management program which allows a user to set up description records of service package(s) and the host that belong to this package. The system is hierarchical, this means that a package can have sub-categories, sub-categories can have further sub-categories etc. Definitions of services can be retrieved or modified from the host database if the service is already individually registered.

Data that are stored in the service packaging tables includes name of the service, short description of what is offered, full description, hyper-link to the service, service provider name, opening hours, location, billing tariff, bitmap and HTML header and trailer for directory page, link to advertisement pages of service provider, and package membership of this service.

Based on this formation, an automatic HTML directory application is generated from the data stored in the RDBMS. This application can be in the limited individual for each user, so that each user enters in a complete customized welcome tree, from where he can select services from the service categories he has subscribed to. In practice a limited number of service packages will be created to fit the needs of certain groups of users.

This application interacts at run-time with the call validation of the access services, in order to define the necessary call filters or white-lists depending on the service packages the user has subscribed to. This toolkit offers the operator the flexibility to offer a selected, nicely packaged and categorized offering out of the global set of applications available on his networks.

The service management subsystem software incorporates very powerful code that covers the collection of call data records (CDR) from various network servers, the secure storage of those CDRs, the application of tariff rates on those "raw" CDR, the storage in tables, the updating of the user accounts, the production of a paper bill or forwarding to external billing system, and the keeping of statistics. A wide variety of billing methods is available to have totally tailored billing for individual users and applications.

The call and session tickets will be received from the network access servers (via Radius protocol 211) and stored on the service management subsystem machines in the call and session ticket files 214. The tickets will be inserted in records in the RDBMS via the accounting procedures. The transformation of "raw" CDR into "result" CDR is performed by an application program. These result records can then be used to produce bills in any desired format by making use of standard based report generators. In addition, standard commercial tools can be used to produce all kinds of statistics in nice graphical representations. The RDBMS data can also be used to provide on-line billing display facilities towards the end-user with billing report generator and files 216.

The service management subsystem fully supports the concept of virtual private networks. In practice this means that all above described features and data can be "qualified" with a virtual private network identifier, identifying to which VPN the data belong.

A virtual network can have its own users, services and even complete billing and tariff structure. Therefore, all data tables in the databases include a VPN identifier. The owner/manager of a VPN can manage users, hosts, service packages, tariff structures, etc. by the same tools as the overall system operator but with the restriction that the scope of operations is restricted to this users, host, tariffs which belong to his VPN. These tools effectively allow an operator to optimize and out source network infrastructure to third parties.

Setting up of VPN's is done by the overall network manager which defines the VPN operator management accounts that can manage their VPN (create users, host and applications belonging to their VPN, setting tariff structures for their VPN), eventual reserved resources to the VPN, restrictions, etc.

In the IN model, media gateways communicate to the service execution layer much as the service switching point (SSPs) and the signal transfer points (STPs) in the CCF/ SSF/SRF (call control function/service switching function/ specialized resource function) layer 220. The primary functions of the SSF in the IN model are detection of service requests, triggering of the proper service, and execution and handling of communications with the service logic. Events in the network are communicated to the service execution layer as well. Common communication protocols include, for example, AIN, CS1, CS2, INAP, MAP, IS41, CAMEL running on top of SS7. INAP may also function as the communication protocol over TCP/IP from a media gateway. The interface to the service execution layer in other network elements may be implemented as dedicated peripherals (specialized resource functions) and PABXs (private automatic branch exchanges).

Media Gateways are terminated at the service execution layer via interface handlers. Interface protocols running on top of SS7 are terminated on dedicated controllers. These controllers interwork with the service logic required at a specific moment. Several controllers can work at the same instance with one specific service logic for a specific customer operating simultaneously in several networks. For example, a customer may have accesses via a wireline and a wireless network to a single service communicating with these type of networks respectively via CS1 and IS41.

For IN, the call control layer is embedded in the service logic and executed by the SLI (service logic interpreter). Services logic is defined at service creation time (using the service creation environment function 221) with service independent building blocks (SIBs) linked to form service logic programs (SLP). These SIBs define the features, data and management actions required in the course of a service execution. The SIBs are generally service-independent, meaning the features/functions defined for the SIB can be reused for other services. In many cases these functions are not related to specific network environments and not directly related to the type of medium, be it voice or data. The exception to this is the interface protocol SIBs which are constructed specifically to interface with specific protocols. As the interface protocols to the media gateways are handled via interface-related SIBs, services logic can be easily adapted to new types of interfaces. Implementing SIBs of multiple interfaces, within a single service, allows that service to communicate with multiple different media gateways, directories, or other network elements.

The SLI executes services by using the related SLP-based on trigger events received from the media gateways (i.e. in this case, SSPs). Because the SLI masks service logic execution from the underlying platform layers, service engineers have the freedom to develop services without in-depth platform knowledge. A working knowledge of available parameters via the interface protocols and data access is all that is required.

Service logic also controls special resource functions in the network. These functions include policy enforcement, bandwidth control, access authorization, invoking voice or text announcements, detection of user input (signals or voice), control of unified messaging, and prompting a variety of notification mechanisms.

The SCF (service control function, 222 supports billing of IN calls irrespective of whether the call detailed records is created by the SCP (service control point) itself or in the media gateways. This function provides flexible customer-specific charging options that are applicable according to the customer profile.

The data services identified in the system and method 11 architecture are partly provided as IN services. IN does not make a true distinction between types of services, but rather features (e.g. authentication, authorization and accounting) as part of the services.

Service data function 224 handles database access. The data defines the features assigned for each customer, policy information, logical flow of dedicated features, and special charging agreements. The data is kept in a local or remote database according to the entity owning the data. The databases are currently set up in relation to the service needing the particular data. During the service creation process, databases are structured according to the features offered by the service. Specific data related to each customer is then provisioned during the on-line service creation process. However, with data maintained separately from the service logic, customer data can be integrated independent of service type. Single customer profiles may contain data for access services, transport services, and content services alike. This capability allows customer data to be seen as a complete network entity describing the whole customer profile including all defined services options.

The SMP (service management function) 226 provides and interfaces to operators's legacy systems (customer care & billing systems, management information systems) via TCP/IP bearers. Protocols are implemented as already operated by these systems.

Several levels of operator management are defined in the SMA_Function from which the provider and subscriber (customer) operator roles are the most common. The service creation on line function creates the service instance for the subscriber, needed for the service deployment and commercialization phase.

The provider operator is responsible for specific service management. Note that for several services distinct providers may be active on the same management platform.

Provisioning of the service to the customers is handled via GUIs. The provider handles the business aspects of the service(s). Apart from the commercialization of the service the provider creates the service variant required by the customer. Customers have also extended control capabilities on their services via the subscriber management function. Control of the service relates to the tasks and information agreed upon with the provider. The management tools (presented to the customer via graphical screen lay-outs) allow the customer to manage (in real time) his service related parameters and obtain valuable statistics on the service(s) usage. Charging of these subscriber actions is done on the SMP in accordance to the providers policy.

The goal of the SCE tool set is to provide tools related to the activity deployed by and the result required by the SCE user. Tasks are related to the pure definition or specification of the service, to the engineering part of the service and to customer oriented creation of the service. In this respect the SCE tool set is available on a dedicated environment, the service creation environment, and on the service management point.

The mapping of the IN functions onto the system and method 11 architecture shows that a lot of functions smoothly fit into the functions required for the IP services core and services operations architecture. The functions deployed today via IN already go beyond the pure voice related requirements for wireline and wireless systems. These functions can be extended and enhanced, together with proper interworking interfaces to other media gateways, to provide overall converged services.

The system and method 11 architecture of the present invention is designed for supporting value-added services on current and new media gateway devices. It is situated in the network and service control area of the network. It is an architecture that allows smooth incorporation of legacy equipment, new devices and corresponding services. It is in accordance with new standards under development and oriented to the overall control of (IP) data networks without forgetting the current installed switched voice networks.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A system of controlling and managing voice and data services in a telecommunications network:
    a media gateway interface coupled to a plurality of diverse voice and data media gateways operating under diverse protocols in the telecommunications network, the media gateway interface being operable to communicate service logic with the media gateways;
    a media gateway controller in communications with the media gateway interface and media gateways and carrying out service logic for a voice or data service according to input received from the media gateways, said service logic utilizing internal and external databases handlers to access data from internal and external databases;
    a service management subsystem in communications with the media gateway controller and being operable to provision services with customers and provide service management-tools for managing the services;
    a service creation subsystem in communications with the service management subsystem and being operable to provide service creation tools for creating the service logic of the services; and
    a customer care subsystem in communications with the service management subsystem and being operable to generate billing records and customer invoices for the voice and data services.

2. The system, as set forth in claim 1, further comprising a service assurance subsystem in communications with the service management subsystem and being operable to collect data and voice service events and monitor the performance of data and voice services in the network.

3. The system, as set forth in claim 2, wherein the service assurance subsystem is further operable to detect and protect against fraudulent usage of services.

4. The system, as set forth in claim 2, wherein the service assurance subsystem is further operable to manage service level agreements.

5. The system, as set forth in claim 1, further comprising a network management subsystem in communications with the media gateway controller and being operable to monitor and manage the behavior of the media gateways.

6. The system, as set forth in claim 1, further comprising a directory in communications with the service management subsystem and the media gateway controller and being operable to provide customer name, location and domain translations.

7. The system, as set forth in claim 1, wherein the media gateway interface is operable to interface with media gateways operating under the SS7 signaling protocol.

8. The system, as set forth in claim 1, wherein the media gateway interface is operable to interface with media gateways operating under the IPDC/SGCP protocol.

9. The system, as set forth in claim 1, wherein the media gateway interface is operable to interface with media gateways operating under the RAS protocol.

10. The system, as set forth in claim 1, wherein the service logic comprises logic for mediation services.

11. The system, as set forth in claim 1, wherein the service logic comprises logic for authentication, authorization, and accounting services.

12. The system, as set forth in claim 1, wherein the service logic comprises logic for virtual private network services.

13. The system, as set forth in claim 1, wherein the service logic comprises logic for device and client configuration data services.

14. The system, as set forth in claim 1, wherein the service logic comprises logic for class services.

15. The system, as set forth in claim 1, wherein the service management subsystem further comprises customer self service tools for network operators, content service providers and end-users to enter, view and edit service data.

16. A system of controlling and managing voice and data services in a telecommunications network:
    a media gateway interface coupled to a plurality of diverse voice and data media gateways operating under diverse protocols in the telecommunications network, the media gateway interface being operable to communicate service logic with the media gateways;
    a media gateway controller in communications with the media gateway interface and media gateways and carrying out service logic for a voice or data service according to input received from the media gateways, said service logic utilizing internal and external databases handlers to access data from internal and external databases;
    a service management subsystem in communications with the media gateway controller and being operable to provision services with customers and provide service management tools for managing the services;
    a service creation subsystem in communications with the service management subsystem and being operable to provide service creation tools for creating the service logic of the services;
    a customer care subsystem in communications with the service management subsystem and being operable to generate billing records and customer invoices for the voice and data services;
    a service assurance subsystem in communications with the service management subsystem and being operable to collect data and voice service events and monitor the performance of data and voice services in the network;
    a network management subsystem in communications with the media gateway controller and being operable to monitor and manage the behavior of the media gateways; and
    a directory in communications with the service management subsystem and the media gateway controller and being operable to provide customer name, location and domain translations.

17. The system, as set forth in claim 16, wherein the service assurance subsystem is further operable to detect and protect against fraudulent usage of services.

18. The system, as set forth in claim 16, wherein the service assurance subsystem is further operable to manage service level agreements.

19. The system, as set forth in claim 16, wherein the media gateway interface is operable to interface with media gateways operating under the SS7 signaling protocol.

20. The system, as set forth in claim 16, wherein the media gateway interface is operable to interface with media gateways operating under the IPDC/SGCP protocol.

21. The system, as set forth in claim 16, wherein the media gateway interface is operable to interface with media gateways operating under the RAS protocol.

22. The system, as set forth in claim 16, wherein the service logic comprises logic for mediation services.

23. The system, as set forth in claim 16, wherein the service logic comprises logic for authentication, authorization, and accounting services.

24. The system, as set forth in claim 16, wherein the service logic comprises logic for virtual private network services.

25. The system, as set forth in claim 16, wherein the service logic comprises logic for device and client configuration data services.

26. The system, as set forth in claim 16, wherein the service logic comprises logic for class services.

27. The system, as set forth in claim 16, wherein the service logic comprises logic for voice mail, calling card and number portability services.

28. The system, as set forth in claim 16, wherein the service management subsystem further comprises customer self service tools for network operators, content service providers and end-users to enter, view and edit service data.

* * * * *